(12) United States Patent
Rowe et al.

(10) Patent No.: US 9,116,630 B2
(45) Date of Patent: Aug. 25, 2015

(54) METHOD AND SYSTEM FOR MIGRATING DATA BETWEEN STORAGE DEVICES OF A STORAGE ARRAY

(71) Applicant: Nimble Storage, Inc., San Jose, CA (US)

(72) Inventors: Brian Rowe, San Jose, CA (US); Bob Fozard, Los Gatos, CA (US)

(73) Assignee: Nimble Storage, Inc., San Jose, CA (US)

( * ) Notice: Subject to any disclaimer, the term of this patent is extended or adjusted under 35 U.S.C. 154(b) by 222 days.

(21) Appl. No.: 14/015,814

(22) Filed: Aug. 30, 2013

(65) Prior Publication Data

US 2015/0067247 A1 Mar. 5, 2015

(51) Int. Cl.
*G06F 3/06* (2006.01)
(52) U.S. Cl.
CPC ............ *G06F 3/0647* (2013.01); *G06F 3/0619* (2013.01); *G06F 3/0689* (2013.01)
(58) Field of Classification Search
CPC .................................................... G06F 3/0647
USPC ........................................................ 711/105
See application file for complete search history.

(56) References Cited

U.S. PATENT DOCUMENTS

| 8,554,918 | B1* | 10/2013 | Douglis ........................ 709/226 |
| 2005/0086705 | A1* | 4/2005 | Jarman et al. ................. 725/136 |
| 2008/0208840 | A1* | 8/2008 | Zhang et al. ....................... 707/5 |
| 2014/0082279 | A1* | 3/2014 | Kimmel et al. ............... 711/114 |
| 2014/0282244 | A1* | 9/2014 | Speer et al. ................... 715/811 |

OTHER PUBLICATIONS

Seo, Beomjoo, "Survey on Data Placement and Migration Algorithms in Distributed Disk Systems", Proceedings of 2004 International Conference on Parallel and Distributed Processing Techniques and Applications (PDPTA 2004), Las Vegas, Nevada, USA, Jun. 21-24, 2004.
Zheng, W. and Zhang, G., Fastscale: Accelerate raid scaling by minimizing data migration, Proceedings of the 9th USENIX Conference on File and Storage Technologies (FAST), Feb. 2011.
Weil, Sage A. et al., "CRUSH: controlled, scalable, decentralized placement of replicated data", Proceedings of the 2006 ACM/IEEE conference on Supercomputing, Nov. 11-17, 2006, Tampa, Florida.
Zimmerman, Roger and Seo, Beomjoo, "Efficient Disk Replacement and Data Migration Algorithms for Large Disk Subsystems" Proceedings of the 2004 International Conference on Parallel and Distributed Processing Techniques and Applications (PDPTA 2004), Jun. 21-24, 2004, Las Vegas, Nevada.
Datastax, "About data distribution and replication" (2013) 3 pgs.
"Data striping and Redundancy", The RAID Tutorial, College of Engineering, UMassAmherst, accessed Aug. 1, 2013 from: http://www.ecs.umass.edu/ece/koren/architecture/Raid/striping.html, 2 pgs.

* cited by examiner

*Primary Examiner* — Cheng-Yuan Tseng
*Assistant Examiner* — Zubair Ahmed
(74) *Attorney, Agent, or Firm* — Ascenda Law Group, PC.

(57) ABSTRACT

Described herein are methods, systems and machine-readable media for migrating data between storage devices of a storage array. A metric is used to measure the optimality of candidate data migrations, the metric taking into account capacity balance and proper data striping. Candidate migrations are evaluated against the metric. The candidate migration that ranks as the best migration according to the metric may be carried out. This process of evaluating candidate migrations and carrying out the best candidate migration may be iterated until data is properly distributed among the storage devices of the storage array.

14 Claims, 13 Drawing Sheets

Bin Map: (A, B, C, B, A, B, C, B, A, B, C, B | A, B, C, B, A)

| Sub-range | # of A's | # of B's | # of C's | # of D's | Metrics | |
|---|---|---|---|---|---|---|
| | | | | | L1 Norm | Vector Angle |
| 0 | 2 | 3 | 1 | 0 | -4 | -0.706499716 |
| 1 | 1 | 3 | 2 | 0 | -4 | -0.706499716 |
| 2 | 1 | 3 | 2 | 0 | -4 | -0.706499716 |
| 3 | 2 | 3 | 1 | 0 | -4 | -0.706499716 |
| 4 | 2 | 3 | 1 | 0 | -4 | -0.706499716 |
| 5 | 1 | 3 | 2 | 0 | -4 | -0.706499716 |
| 6 | 1 | 3 | 2 | 0 | -4 | -0.706499716 |
| 7 | 2 | 3 | 1 | 0 | -4 | -0.706499716 |
| 8 | 2 | 3 | 1 | 0 | -4 | -0.706499716 |
| 9 | 1 | 3 | 2 | 0 | -4 | -0.706499716 |
| 10 | 1 | 3 | 2 | 0 | -4 | -0.706499716 |
| 11 | 2 | 3 | 1 | 0 | -4 | -0.706499716 |
| | | | | | -48 | -8.477996586 |

Fig. 9

Bin Map: (D, B, C, B, A, B, C, B, A, B, C, B, | D, B, C, B, A)

| Sub-range | # of A's | # of B's | # of C's | # of D's | Metrics | |
|---|---|---|---|---|---|---|
| | | | | | L1 Norm | Vector Angle |
| 0 | 1 | 3 | 1 | 1 | -2 | -0.420534335 |
| 1 | 1 | 3 | 2 | 0 | -4 | -0.706499716 |
| 2 | 1 | 3 | 2 | 0 | -4 | -0.706499716 |
| 3 | 2 | 3 | 1 | 0 | -4 | -0.706499716 |
| 4 | 2 | 3 | 1 | 0 | -4 | -0.706499716 |
| 5 | 1 | 3 | 2 | 0 | -4 | -0.706499716 |
| 6 | 1 | 3 | 2 | 0 | -4 | -0.706499716 |
| 7 | 1 | 3 | 1 | 1 | -2 | -0.420534335 |
| 8 | 1 | 3 | 1 | 1 | -2 | -0.420534335 |
| 9 | 0 | 3 | 2 | 1 | -4 | -0.563942641 |
| 10 | 0 | 3 | 2 | 1 | -4 | -0.563942641 |
| 11 | 1 | 3 | 1 | 1 | -2 | -0.420534335 |
| | | | | | -40 | -7.049020917 |

FIG. 10

Bin Map: (A, D, C, B, A, B, C, B, A, B, C, B, | A, D, C, B, A)

| Sub-range | # of A's | # of B's | # of C's | # of D's | Metrics | |
|---|---|---|---|---|---|---|
| | | | | | L1 Norm | Vector Angle |
| 0 | 2 | 2 | 1 | 1 | -2 | -0.451026812 |
| 1 | 1 | 2 | 2 | 1 | -2 | -0.451026812 |
| 2 | 1 | 3 | 2 | 0 | -4 | -0.706499716 |
| 3 | 2 | 3 | 1 | 0 | -4 | -0.706499716 |
| 4 | 2 | 3 | 1 | 0 | -4 | -0.706499716 |
| 5 | 1 | 3 | 2 | 0 | -4 | -0.706499716 |
| 6 | 1 | 3 | 2 | 0 | -4 | -0.706499716 |
| 7 | 2 | 3 | 1 | 0 | -4 | -0.706499716 |
| 8 | 2 | 2 | 1 | 1 | -2 | -0.451026812 |
| 9 | 1 | 2 | 2 | 1 | -2 | -0.451026812 |
| 10 | 1 | 2 | 2 | 1 | -2 | -0.451026812 |
| 11 | 2 | 2 | 1 | 1 | -2 | -0.451026812 |
| | | | | | -36 | -6.945159164 |

FIG. 11

METHOD AND SYSTEM FOR MIGRATING DATA BETWEEN STORAGE DEVICES OF A STORAGE ARRAY

FIELD OF THE INVENTION

The present invention relates to methods, systems and machine-readable media for performing data migration between storage devices of a storage array, and more particularly relates to migrating data in a way that balances the respective capacity (e.g., balance the respective free storage space) of the storage devices, as well as maintains a data distribution between the storage devices that allows for performance gains through data striping.

BACKGROUND

In a storage system with a storage array, data is stored across a plurality of data storage devices. Such data storage devices may be solid-state devices (SSDs) and/or magnetic disk drives, as in a Nimble Storage array manufactured by Nimble Storage™ of San Jose, Calif.

One technique that is employed in a storage array is data striping. Using a simplified example to illustrate data striping, suppose a document is to be stored on three data storage devices (A, B, C) in a storage array. In one data striping routine, the first word of the document may be written to device A; the second word of the document may be written to device B; the third word of the document may be written to device C; the fourth word of the document may be written to device A; the fifth word of the document may be written to device B; the sixth word document may be written to device C; and so on. Since there are 3 separate devices, three write operations may occur at the same time. Stated differently, the first, second and third words may be written in parallel to devices A, B and C, respectively; the fourth, fifth and sixth words may be written in parallel to devices A, B and C, respectively; and so on. Likewise, when the document is read from the storage devices, 3 words can be read at once: the first, second and third words may be read in parallel from devices A, B and C, respectively; the fourth, fifth and sixth words may read in parallel from devices A, B and C, respectively; and so on. Such example helps illustrate the increased read and write throughput (i.e., I/O throughput) for a storage array that uses data striping, as compared to a storage array that does not use data striping.

For a storage array to fully take advantage of the increased throughput available through data striping, each of the storage devices must have room to write new data. Otherwise, the data may only be written to the remaining storage devices (i.e., those that still have room), reducing the I/O throughput. In practice, storage devices within a storage array may reach (or approach) their respective capacities at different times. For instance, a storage device having a smaller capacity may reach its capacity sooner than a storage device having a larger capacity. Even if storage devices were to fill up at similar rates, a storage device that has been in use for a longer time would be expected to fill up before a storage device that has been in use for a shorter time. Such examples illustrate that, in general, some storage devices in a storage array may be more occupied (e.g., in terms of a percent of total capacity of a storage device) than other storage devices. To prevent one or more of the storage devices from completely filling up, data is typically migrated from storage devices that are more occupied to storage devices that are less occupied. While data migration techniques have been deployed in the field and exist in the literature, such data migration techniques are often computationally intensive and/or fail to preserve properties of the data distribution (i.e., how data is distributed among the storage devices) that are needed to fully take advantage of the potential gains (e.g., increased throughput) from data striping.

SUMMARY OF THE INVENTION

In one embodiment, methods, systems and machine-readable media are provided to migrate data between storage devices of a storage array. Data may be divided into fixed sized portions of data called slices; slices may be grouped into a set called a bin; and bins may be assigned to nodes, another name for a storage device. The assignment of bins to nodes is called a bin map. In this context, data migration involves modifying the bin map (i.e., reassigning a bin from one node to another node).

One goal of data migration is to balance the respective capacity (e.g., balance the respective free storage space) of the storage devices. In the framework provided above, capacity balancing may involve assigning a number of bins to a node that is proportional to the capacity of the node. In other words, a node that has a larger capacity should be assigned more bins than a node with a smaller capacity.

Another goal of data migration is to maintain (or improve) a data distribution between the storage devices that allows for performance gains through data striping. In the framework provided above, a more optimal data distribution involves assigning sequentially numbered bins to separate nodes.

In one embodiment of the invention, a metric (called stripiness) is used to quantify how well a bin map satisfies the above-described goals (or criteria). Candidate bin reassignments are systematically evaluated against this metric. The candidate bin reassignment that receives the best measure of stripiness is carried out (i.e., data migration is performed in accordance with the optimal bin reassignment). The process of evaluating a collection of candidate bins according to the metric and carrying out the best bin reassignment may be repeated until a certain criterion is met. Such criterion may include no further improvement (or substantially no improvement) in the stripiness evaluation.

These and other embodiments of the invention are more fully described in association with the drawings below.

BRIEF DESCRIPTION OF THE DRAWINGS

The present invention is illustrated by way of example, and not limitation, in the figures of the accompanying drawings in which:

FIG. 9 depicts a table with intermediate and final values in the calculation of the L1 Norm and Vector Angle stripiness of a bin map, in accordance with one embodiment of the invention;

FIG. 10 depicts a table with intermediate and final values in the calculation of the L1 Norm and Vector Angle stripiness of a bin map, in accordance with one embodiment of the invention;

FIG. 11 depicts a table with intermediate and final values in the calculation of the L1 Norm and Vector Angle stripiness of a bin map, in accordance with one embodiment of the invention;

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
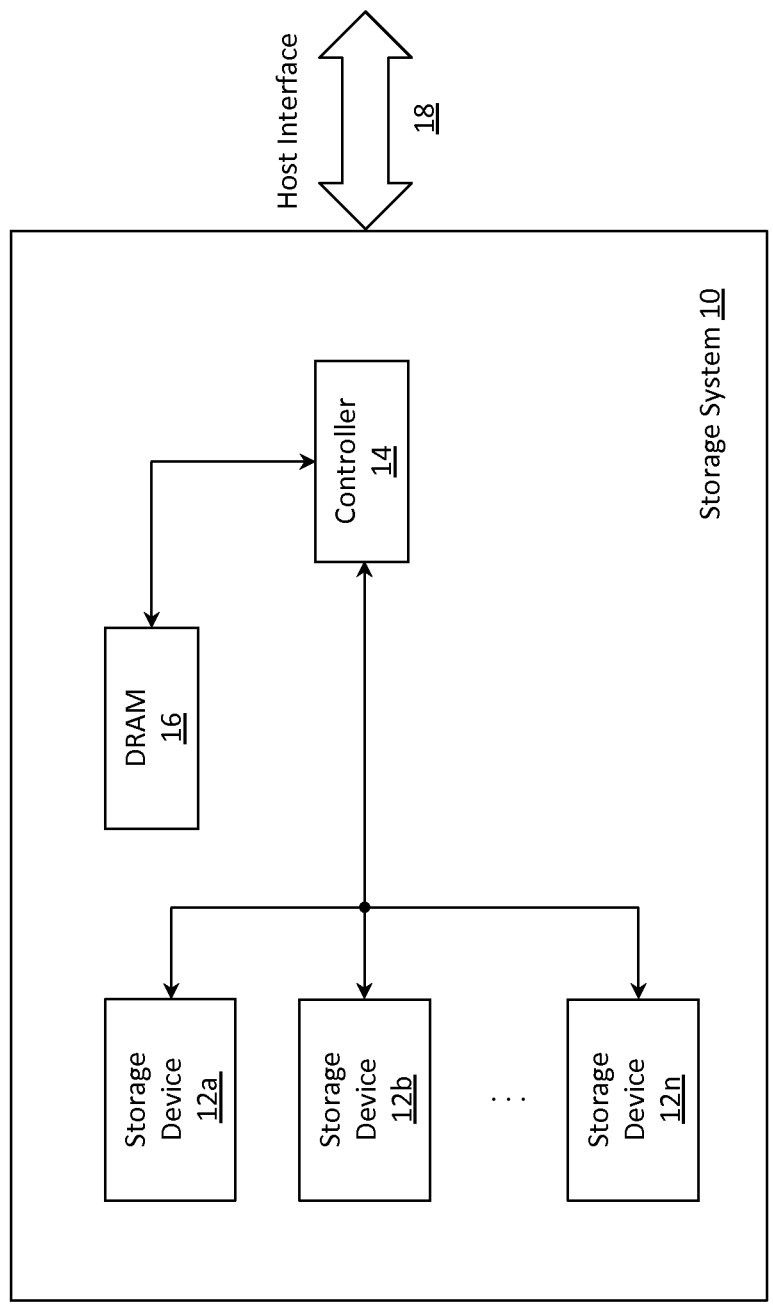
FIG. 1 depicts a storage system comprising a plurality of storage devices, within which techniques of the present invention may be applied.

FIG. 1 depicts storage system 10, in accordance with one embodiment of the invention. Storage system 10 includes a plurality of storage devices (12a, 12b, . . . 12n), such as solid-state storage devices (e.g., flash-memory based devices), and magnetic disk storage devices (e.g., hard drives), etc. A storage device may also include a storage appliance. A particular storage appliance may be constructed as an array of JBODs (Just a Bunch Of Disks or Just a Bunch Of Drives), with each JBOD communicatively connected to one another through a controller within the storage appliance. Storage devices (12a, 12b, . . . 12n) may be located at the same geographical location (and could also be co-located within the same chassis), while it is also possible for storage devices (12a, 12b, . . . 12n) to be located at different geographical locations and be communicatively connected with one another via a computer network. The plurality of storage devices may be interfaced to host interface 18 via controller 14. Controller 14 may implement a data striping algorithm, such that one volume (i.e., a discrete set of data) is distributed across the plurality of storage devices. Controller 14 may simultaneously write data to each of the plurality of storage devices, thereby increasing the write throughput. Likewise, controller 14 may simultaneously read data from each of the plurality of storage devices, thereby increasing the read throughput. Instructions necessary for the controller 14 to perform its operations may be stored in DRAM 16.

Figure 2:
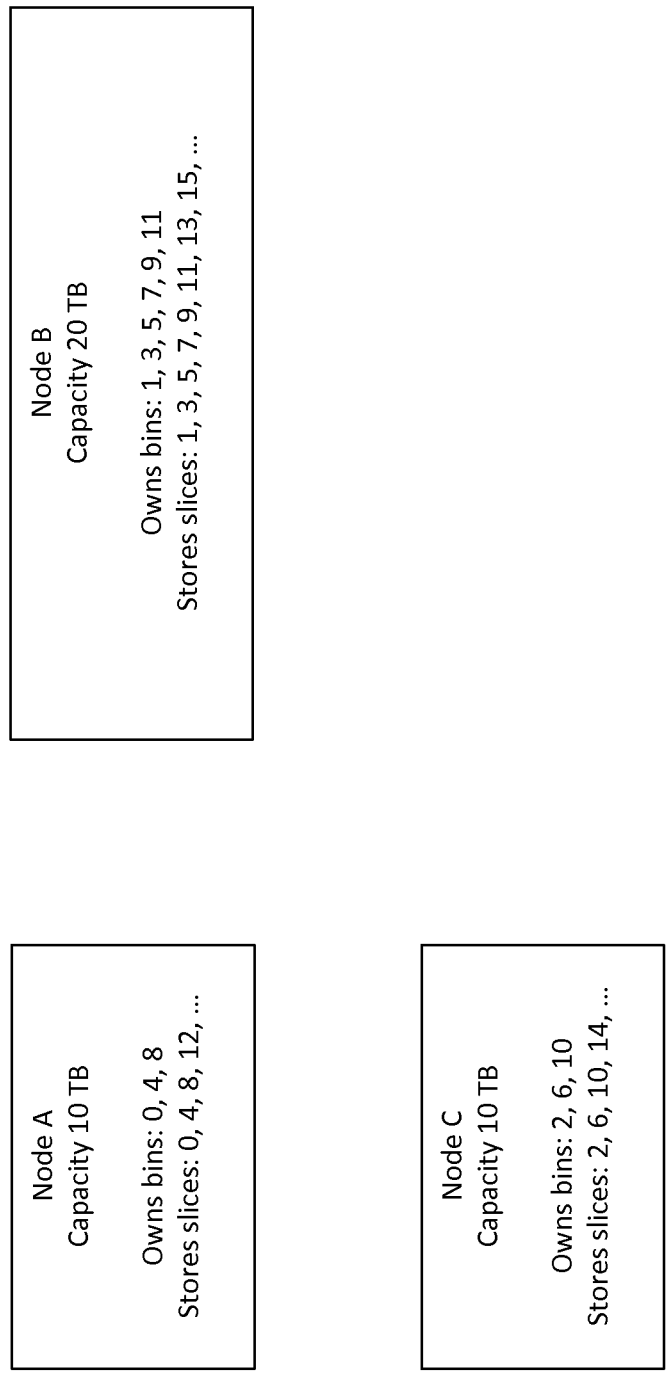
FIG. 2 depicts a collection of nodes, with an assignment of slices and bins to each node, in accordance with one embodiment of the invention.

FIG. 2 depicts three storage devices (Node A, Node B, and Node C) that may be present in a storage system. For instance, Node A may represent storage device 12a; Node B may represent storage device 12b; and Node C may represent storage device 12c. For the remainder of the discussion, storage devices may be referred to as nodes. More specifically, each node may be an independent device storing a portion of a volume (i.e., a discrete set of data). Each node is independent in the sense that each node may perform a read/write operation independently of another node.

A volume may be divided into a large number of fixed size portions of data, called slices. Slices may be numbered (e.g., 0, 1, 2, . . . ) according to their respective position from the beginning of the volume.

Slices (e.g., oftentimes noncontiguous slices) may be grouped into a set, called a bin. Bins may also be numbered (e.g., 0, 1, 2, . . . ). In a storage system with X bins numbered 0, 1, 2 . . . X−2, X−1, and Y slices numbered 0, 1, 2 . . . Y−2, Y−1, slice (i*X+N) may be assigned to bin N, for i between 0 and (Y−1−N)/X, and Y being much larger than X. Such slice to bin assignment will be further described in association with FIGS. 2 and 3 below.

Returning to the example depicted in FIG. 2, 12 bins have been distributed among the 3 nodes. Three bins (i.e., bins 0, 4 and 8) have been assigned to Node A; 6 bins (i.e., bins 1, 3, 5, 7, 9 and 11) have been assigned to Node B; and 3 bins (i.e., bins 2, 6 and 10) have been assigned to Node C. Twice the number of bins have been assigned to Node B (as compared to Nodes A and C), since the capacity of Node B (i.e., 20 TB) is double that of the respective capacity of Nodes A and C (i.e., 10 TB). The assignment of slices to bins in FIG. 2 follows the assignment scheme defined above. Slices 0, 12, 24, . . . are assigned to bin 0; slices 4, 16, 28, . . . are assigned to bin 4; and slices 8, 20, 32, . . . are assigned to bin 8. Since bins 0, 4 and 8 are assigned to Node A, slices 0, 4, 8, 12, 16, 20, 24, 28, 32, . . . are in turn assigned to Node A. The assignment of slices to the other nodes may be understood in a similar fashion.

Figure 3:
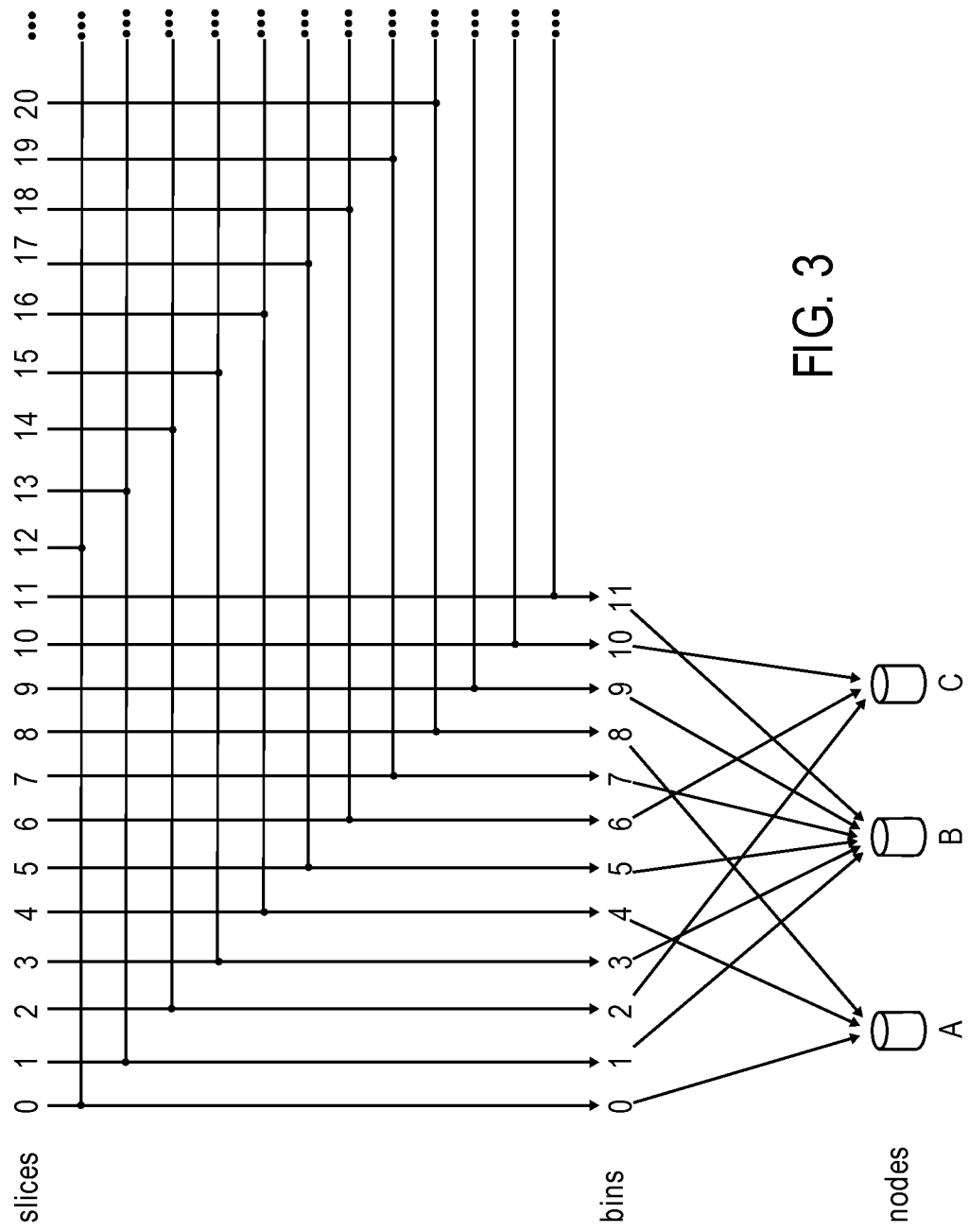
FIG. 3 depicts a graphical assignment of slices to bins and bins to nodes, in accordance with one embodiment of the invention.

FIG. 3 graphically depicts the assignment of slices to bins and the assignment of bins to nodes. In the context of FIG. 3, one may observe that slice 0 is assigned to Node A via bin 0; slice 1 is assigned to Node B via bin 1; slice 2 is assigned to Node C via bin 2; and so on. It can be seen that slices have been assigned to bins and bins have been assigned to nodes in a particular manner that allows for throughput gains via data striping. In particular, adjacent slices have been assigned to different bins and adjacent bins have been assigned to different nodes, with the result of adjacent slices being assigned to different nodes. Such property (i.e., adjacent slices being assigned to different nodes) allows adjacent slices (or even 3 contiguous slices) to be read or written in parallel.

Figure 4:
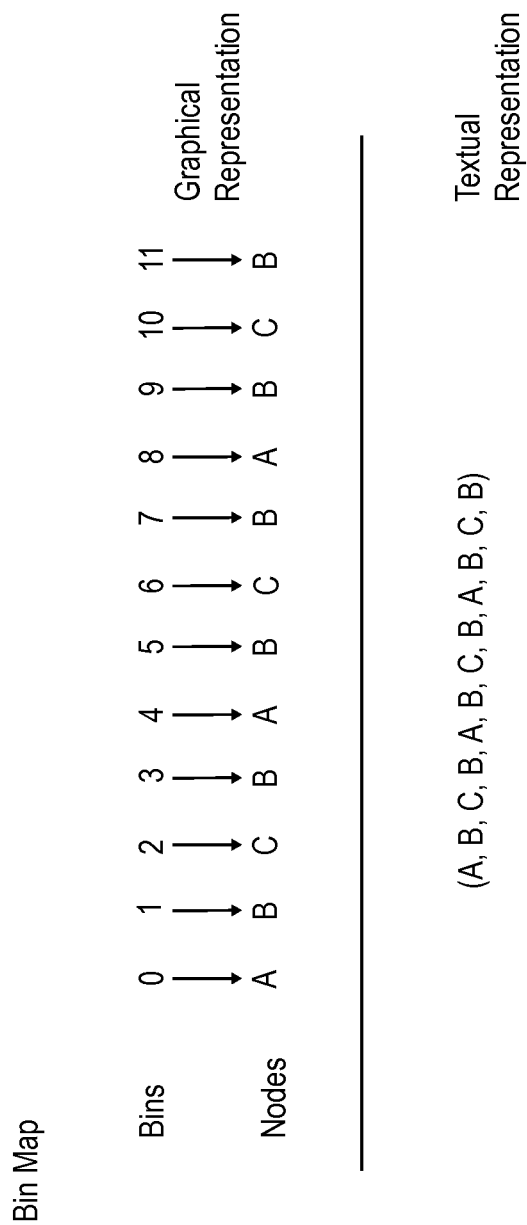
FIG. 4 depicts a graphical and textual representation of a bin map, in accordance with one embodiment of the invention.

For ease of discussion, the mapping from bins to nodes will be called a "bin map". The top portion of FIG. 4 depicts the bin map in a slightly different manner than the bin map in FIG. 3, but the two depictions represent the same bin map. The bottom portion of FIG. 4 presents a textual (or mathematical) way of representing a bin map: (A, B, C, B, A, B, C, B, A, B, C, B). If one interprets the textual representation of the bin map as vector, one may understand that the letter A in the first component of the vector represents bin 0 being mapped to node A, the letter B in the second component of the vector represents bin 1 being mapped to node B, and so on.

Figure 5:
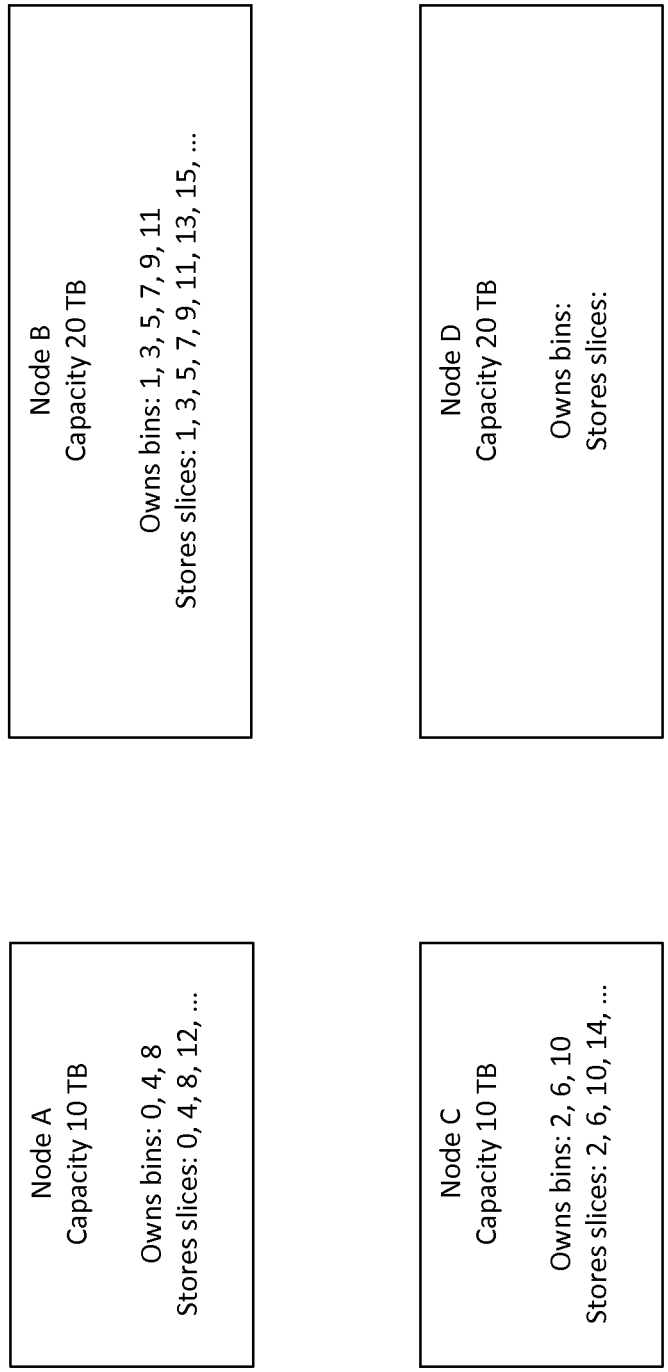
FIG. 5 depicts a collection of nodes, with an assignment of slices and bins to each node, in accordance with one embodiment of the invention.

FIG. 5 depicts Node D (with a capacity of 20 TB) being added to a storage system including Nodes A, B and C. To integrate Node D into a storage system employing data striping, data needs to be migrated to Node D. Data migration techniques, in accordance with one embodiment of the invention, will be now be explained in the context of FIG. 5, although such data migration techniques are applicable to other scenarios described below.

In accordance with one embodiment of the present invention, data is migrated from one node to another node by modifying the bin map (e.g., reassigning a bin from one node to another node). In other words, the problem of data migration is reduced to the problem of (i) determining which bin to reassign and (ii) which node to reassign that bin to. The latter determination can be more concisely described, and will be discussed first. For ease of discussion, "which node to reassign a bin to" will be called the "destination node". Conceptually, one would like to move data to the node that is least utilized (e.g., node that has lowest percent occupancy). In the context where the capacity of all nodes is identical, the destination node may correspond to the node which is most underrepresented in the bin map. In a more generalized context where the capacity of nodes is non-identical, the destination node may correspond to the node that has the minimum ratio of a number of bins assigned to the node divided by the capacity of the node. In the context of FIG. 5, the destination node is Node D, as its ratio is 0 (i.e., 0 assigned bins divided by 20 TB), whereas all other nodes have a ratio that is greater than zero.

We now return to the discussion of which bin to reassign. Before detailing the complete procedure to determine the particular bin to reassign, we first discuss the conceptual framework for such determination. One goal in data migration is capacity balancing within a group of nodes (e.g., in some instances, a group of nodes may be a set of one or more nodes which stores an entire volume). In other words, it is desired that each node has a similar percent of occupancy (e.g., percent of free space, percent of used space, etc.). A second goal in data migration is maintaining (or improving) how data is distributed among the group of nodes (i.e., distributed in a way that allows for throughput gains via data striping). Stated simply, the second goal may be accomplished by minimizing the number of times a bin map has a single node owning adjacent bins (e.g., successively numbered bins).

The inventors realized that a critical aspect in determining which bin to reassign is a metric for measuring the optimality of a bin map in terms of the two above-stated goals. The word "stripiness" was coined by the inventors for this metric. Once there is a metric, all that is needed is to systematically evaluate which bin reassignment best satisfies the metric, and such bin reassignment may be carried out.

The computation of the stripiness metric, according to one embodiment of the invention, is now detailed for a bin map. A first step is the determination of an optimal relative allotment (ORA). An ORA may be found by taking the nodes capacities to minimum relative weights (weights being integer values) and giving each node an entry for every weight. In the example of FIG. 5, where there are four nodes, two (i.e., Nodes A and C) with a base capacity and the others (i.e., Nodes B and D) with double that capacity, the ORA would be {A, B, B, C, D, D}.

Next, every subrange of the ORA's size in the bin map is considered. In the current example, the size of the ORA (i.e., number of elements in {A, B, B, C, D, D}) is 6. Therefore, every subrange of size 6 in the bin map is considered. At the top of FIG. 6, sub-range 0 (i.e., sub-range starting from bin 0) has been labeled for bin map 50, and is (A, B, C, B, A, B). Sub-range 1 is (B, C, B, A, B, C). It is noted that sub-ranges 7 through 11 will not have 6 elements (without any modification to the approach).

To remedy this apparent problem, the bin map is considered to be circular for determining subranges, so there is a subrange starting from every entry in the bin map. To understand why a circular bin map is considered, it is helpful to view the bin map as a template that is repeated in the slice map (i.e., assignment of slices to nodes). In the example of FIG. 2, the bin map, ABCBABCBABCB, can be viewed as a template that is repeated in the slice map ABCBABCBABCBAB-CBABCBABCB . . . . By considering a circular representation of the bin map, one is essentially characterizing properties of the slice map.

Figure 6:
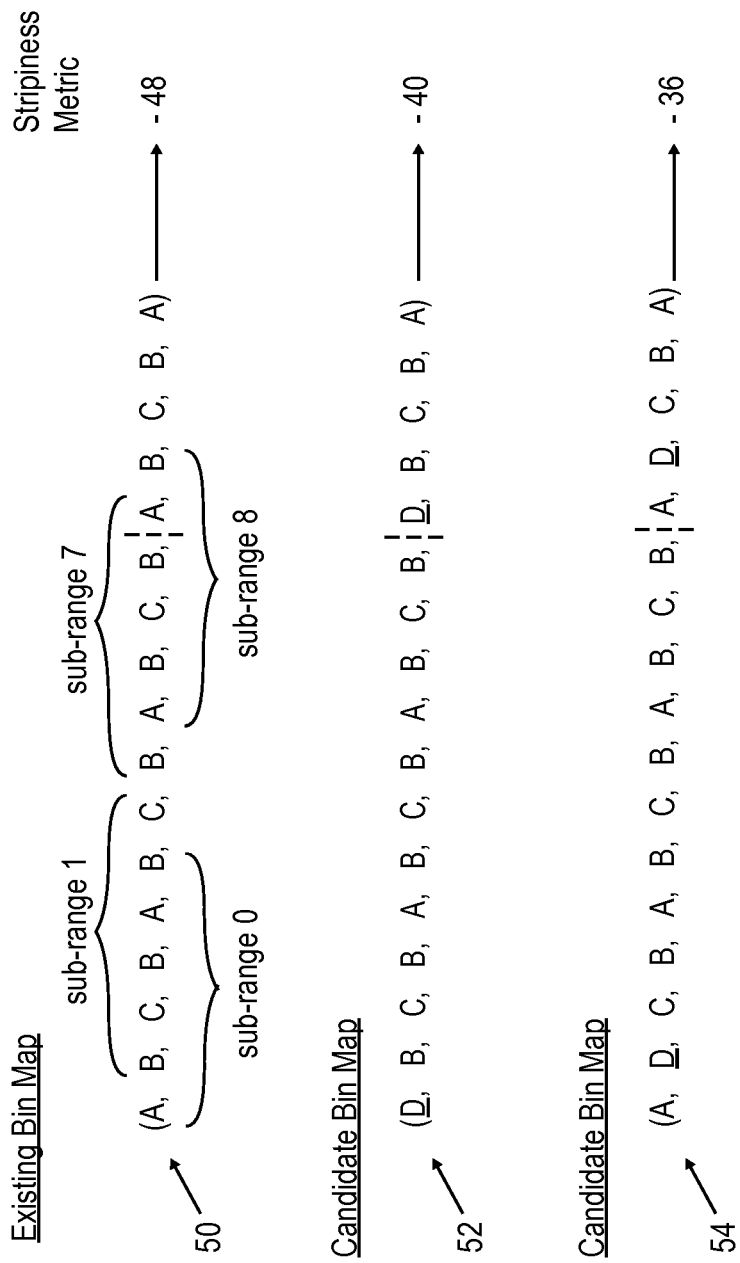
FIG. 6 depicts a plurality of bin maps and a labeling of subranges within one of the bin maps, in accordance with one embodiment of the invention.

In bin map 50 of FIG. 6, rather than depicting a bin map in the form of a circle, a dotted vertical line is drawn depicting the end of the actual bin map, and bin assignments (A, B, C, B, A) from the beginning of bin map 50 are repeated at the end of bin map 50, for ease of illustrating the determination of sub-ranges 7-10. Subrange 7 is (B, A, B, C, B, A); subrange 8 is (A, B, C, B, A, B); and so on.

For each subrange, the number of times each node is represented is compared to how many times it is represented in the ORA. The absolute difference in the number of representations for each node is summed, the sum is multiplied by −1, and then these values are summed for all subranges in the bin map. The final result is the stripiness of that bin map. A stripiness closer to 0 (e.g., less negative) generally indicates a bin map that is more optimal than a bin map with a stripiness farther away from 0 (e.g., more negative).

Continuing with the example in FIG. 6 (i.e., bin map 50), there are 12 subranges of size 6. Comparing subrange 0 (A, B, C, B, A, B) to the ORA {A, B, B, C, D, D}, it can be observed that subrange 0 has 1 more A than optimal, 1 more B than optimal, the correct number of Cs, and 2 too few Ds, which contributes −4 to the stripiness (i.e., −(1+1+0+2)=−4). Upon a similar calculation being performed for all other subranges, and summing the individual contributions to stripiness over all subranges, it may be calculated that the total stripiness of the bin map is −48.

With a procedure for measuring the optimality of a bin map, it is possible to systematically determine the most optimal "bin migration" (i.e., reassignment of bin from one node to another node), and perform that migration. The process can be repeated until the stripiness reaches some level of good enough and/or some termination condition is reached, as further described below.

Figure 7:
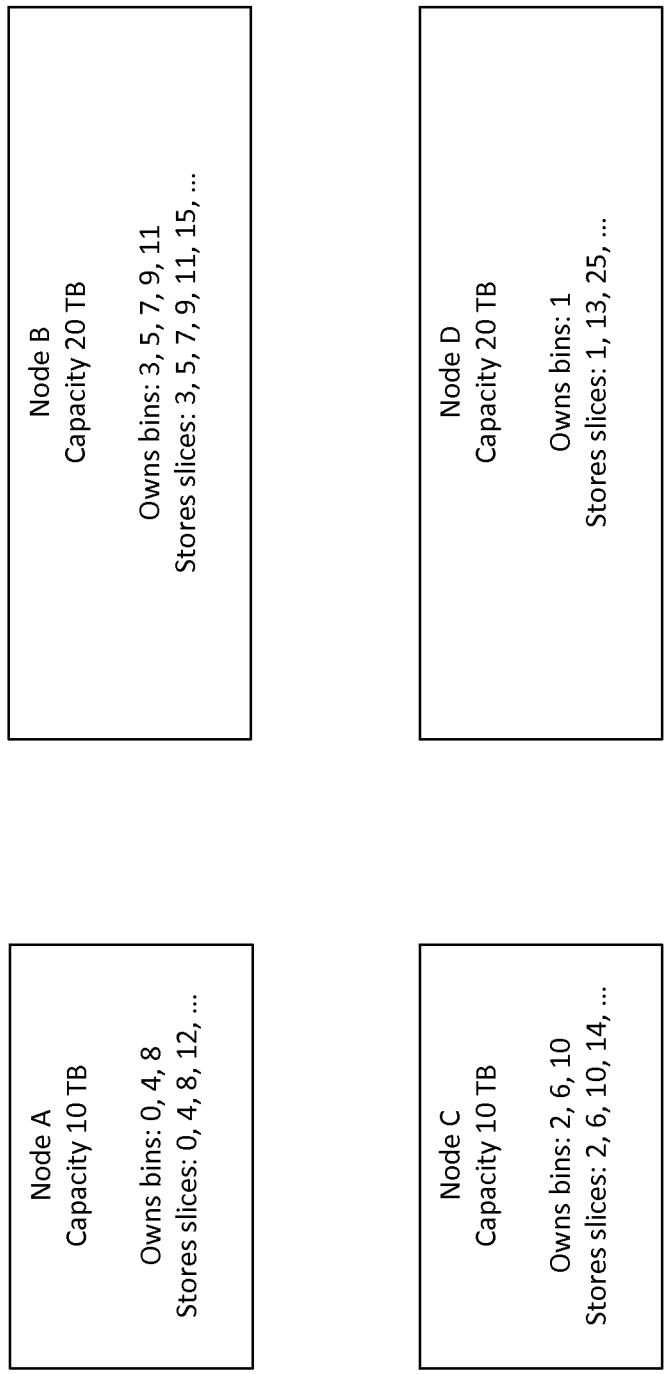
FIG. 7 depicts a collection of nodes, with an assignment of slices and bins to each node, in accordance with one embodiment of the invention.
Figure 8:
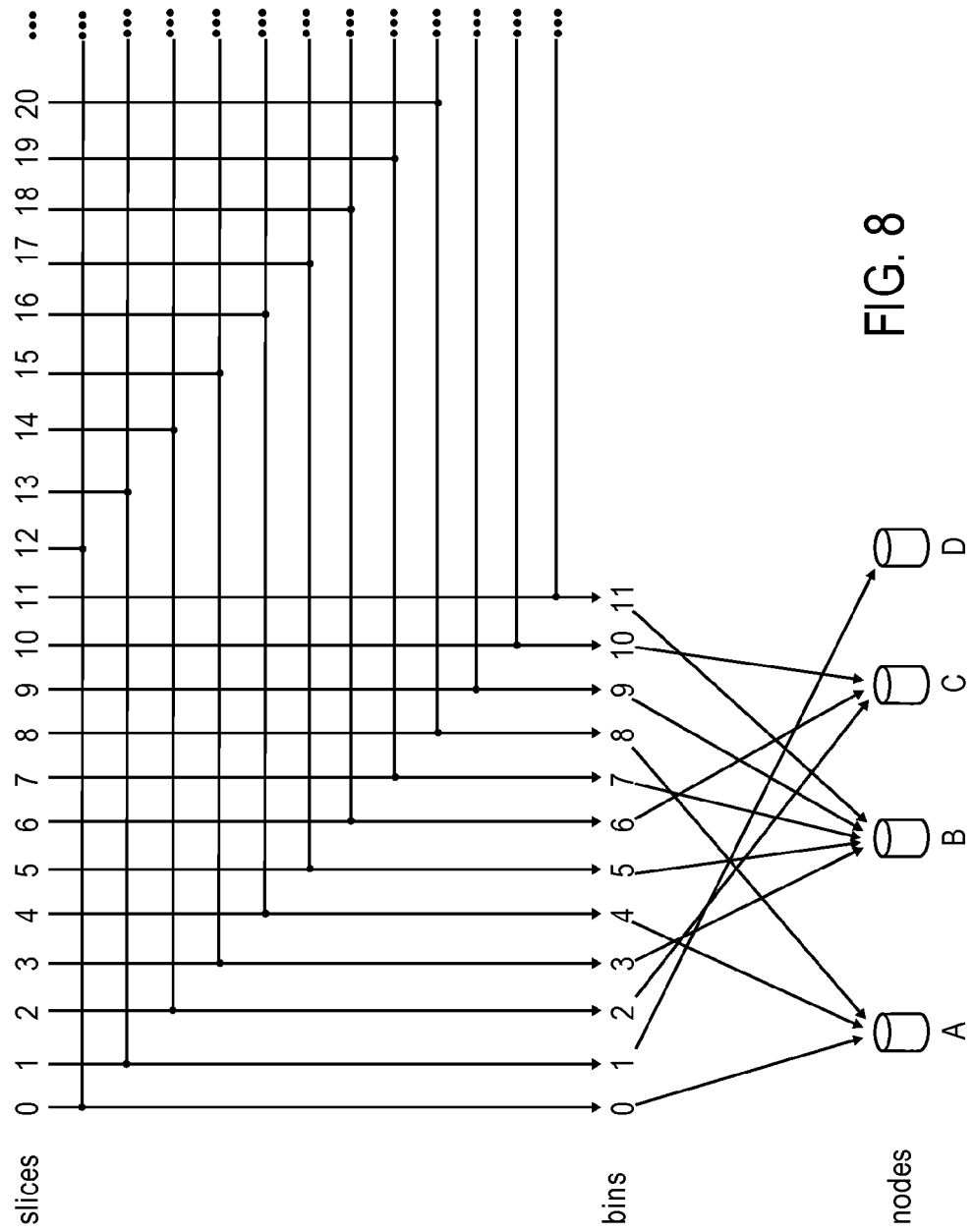
FIG. 8 depicts a graphical assignment of slices to bins and bins to nodes, in accordance with one embodiment of the invention.

As noted above, D is the destination node. In a systematic approach, the stripiness may be calculated for a candidate bin map with bin 0 reassigned from its current node (Node A) to the destination node (Node D). Such candidate bin map is depicted as candidate bin map 52 in FIG. 6. Following the above-described procedure, the stripiness for candidate bin map 52 is calculated to be −40. Next, the stripiness may be calculated for a candidate bin map with bin 1 reassigned from its current node (Node B) to the destination node (Node D). Such candidate bin map is depicted as candidate bin map 54 in FIG. 6. The stripiness for candidate bin map 54 is calculated to be −36. Such calculations may be repeated for other candidate bin maps. Candidate bin map 54 ends up being the most optimal bin map (i.e., with stripiness value closest to 0). As a result of such determination, bin 1 (along with its associated slices) may be reassigned from Node B to Node D, as depicted in FIG. 7. The reassignment of bin 1 from Node B to Node D is also shown in the graphical representation of FIG. 8.

Having now described how to compute the measure of stripiness, it is helpful to appreciate how the stripiness computation satisfies the above-described goals of the conceptual framework. As described above, one goal in data migration is capacity balancing within a group of nodes. In other words, it is desired that each node has a similar percent of occupancy (e.g., percent of free space, percent of used space, etc.). Such goal is fulfilled by appropriately penalizing each sub-range that differs from the ORA (recall the earlier discussion of 1 more A than optimal, 1 more B than optimal, the correct number of Cs, and 2 too few Ds).

Also as described above, a second goal in data migration is maintaining (or improving) how data is distributed among the group of nodes (i.e., distributed in a way that allows for throughput gains via data striping). Stated simply, the second goal may be accomplished by minimizing the number of times a bin map has a single node owning adjacent bins (e.g., successively numbered bins). Such goal is fulfilled by the consideration of subranges of the bin map. Stated differently, if one were only concerned with the first goal, one would not need to consider subranges of the bin map. One would only need to make sure the bin map, as a whole, has the optimal proportion of bins assigned to each node (e.g., the optimal proportion of As, Bs, Cs and Ds). The consideration of subranges introduces a constraint to the stripiness metric that tends to penalize adjacent bins being assigned to the same node. In other words, a first bin map with some adjacent bins being assigned to the same node will tend to have a more negative stripiness measure as compared to a second bin map without any (or with a fewer occurrence of) adjacent bins being assigned the same node, with everything else being equal (e.g., both the first and second bin maps having the same number of As, Bs, Cs and Ds).

The above-described process for computing stripiness is now presented using mathematical notation. The ORA can more compactly be represented by vector b, with the $j^{th}$ component of b being equal to a capacity of the $j^{th}$ node divided by the greatest common divisor (GCD) of a set comprising the capacity of each node. (In the present example, j indexes Nodes A, B, C and D. j=0 corresponds to Node A; j=1 corresponds to Node B; j=2 corresponds to Node C; and j=3 corresponds to Node D.) In the example of FIG. 5, the set comprising the capacity of each node is {10 TB, 20 TB}. The GCD of {10 TB, 20 TB} is 10 TB. Therefore, vector b may be calculated as follows: [capacity of Node A/10 TB, capacity of Node B/10 TB, capacity of Node C/10 TB, capacity of Node D/10 TB]=[10 TB/10 TB, 20 TB/10 TB, 10 TB/10 TB, 20 TB/10 TB]=[1, 2, 1, 2].

For each subrange in the candidate bin map comprising $\|b\|_1$ contiguous bins starting at bin i, vector $a_i$ is formed with the $k^{th}$ component of $a_i$ equal to a number of times the $k^{th}$ node is represented in the subrange starting at bin i. (In the present example, k also indexes Nodes A, B, C and D. k=0 corresponds to Node A; k=1 corresponds to Node B; k=2 corresponds to Node C; and k=3 corresponds to Node D.) The $\|.\|_1$ operator denotes the $l_1$ norm of a vector. For vector x with two components $x_0$ and $x_1$, $\|x\|_1 = |x_0| + |x_1|$. Continuing with the example above, b=[1, 2, 1, 2]. Therefore, $\|b\|_1 = |1| + |2| + |1| + |2| = 6$, and the procedure considers subranges in the candidate bin map comprising 6 contiguous bins. Referring to FIG. 6, the subrange starting at bin 0 is (A, B, C, B, A, B). Therefore, $a_0$=[the number of times A is represented in (A, B, C, B, A, B), the number of times B is represented in (A, B, C, B, A, B), the number of times C is represented in (A, B, C, B, A, B), the number of times D is represented in (A, B, C, B, A, B)]=[2, 3, 1, 0]. $a_1$=[1, 3, 2, 0], $a_2$=[1, 3, 2, 0], and so on. $a_1$ may be read from the table in FIG. 9 as [# of A's, # of B's, # of C's, # of D's] corresponding to the row for sub-range i. Once the vectors b and $a_i$ (for i=0 ... X−1) have been determined, the stripiness for a bin map may be calculated as $$-\sum_{i=0}^{X-1} \|a_i - b\|_1,$$

with X equal to the total number of bins. The table in FIG. 9 also provides intermediate calculations, $-\|a_i-b\|_1$, in the column "L1 Norm" for each subrange i. At the bottom of the column "L1 Norm", values of $-\|a_i-b\|_1$ have been summed over i=0 ... 11 to arrive at stripiness=−48.

Similar calculations are presented for the candidate bin maps (<u>D</u>, B, C, B, A, B, C, B, A, B, C, B) and (A, <u>D</u>, C, B, A, B, C, B, A, B, C, B) in FIGS. 10 and 11, respectively. It may be observed that the # of A's, # of B's, # of C's, # of D's for only certain sub-ranges are modified by reassigning bin 0 to node D (in FIG. 10) and reassigning bin 1 to node D (in FIG. 11). The entries under the headings # of A's, # of B's, # of C's, # of D's in FIGS. 10 and 11 that are modified with respect to the table in FIG. 9 are shaded. Calculations corresponding to sub-ranges in which the # of A's, # of B's, # of C's, # of D's are unchanged from the table in FIG. 9 need not be repeated. In other words, the L1 Norm need only be calculated for subranges 0, 7, 8, 9, 10 and 11 in FIG. 10 and subranges 0, 1, 8, 9, 10 and 11 in FIG. 11. As listed at the bottom of the tables in FIGS. 10 and 11, it is determined that the stripiness for (<u>D</u>, B, C, B, A, B, C, B, A, B, C, B) is −40 and the stripiness for (A, <u>D</u>, C, B, A, B, C, B, A, B, C, B) is −36.

In a minor variation of the above-described stripiness calculation, squared differences may be considered instead of the L1 Norm. In other words, the stripiness for a bin map may be calculated as $$-\sum_{i=0}^{X-1} \|a_i - b\|^2,$$

with X equal to the total number of bins.

A differently formulated stripiness metric is now described that does not require a GCD computation. Vector b is formed with the $j^{th}$ component of b being equal to the capacity of the $j^{th}$ node. Continuing with the example from FIG. 5, b=[10 TB, 20 TB, 10 TB, 20 TB]. For each subrange in the candidate bin map of a predetermined number of contiguous bins starting at bin i, vector $a_i$ is formed with the $k^{th}$ component of $a_i$ equal to the number of times the $k^{th}$ node is represented in the subrange starting at bin i. The predetermined number is chosen as 6 in this example so that previously tabulated values for $a_i$ (in the tables of FIGS. 7-9) may be reused, but other values (e.g., 7, 8, 9, etc.) may be used in practice. For reasons of capacity balance, one is interested in how closely the ratio of (# of A's):(# of B's):(# of C's):(# of D's) matches the ratio of node capacities (i.e., 10 TB:20 TB:10 TB:20 TB in this example). Therefore, a metric that may be appropriate for each subrange i is the vector angle between the vectors $a_i$ and b, which may be calculated as $$\cos^{-1}\left(\frac{a_i \cdot b}{\|a_i\| \|b\|}\right).$$

If the ratios are similar, vectors $a_i$ and b are geometrically aligned and the angle will be a smaller value. If the ratios are dissimilar, vectors $a_i$ and b are not geometrically aligned and the angle will be a larger value. In this different formulation, the stripiness metric may be calculated as the sum of the vector angles (i.e., specifically, vector angles multiplied by −1) over all subranges:

$$-\sum_{i=0}^{X-1} \cos^{-1}\left(\frac{a_i \cdot b}{\|a_i\| \|b\|}\right),$$

with X equal to the total number of bins.

Calculations for the vector angle metric may be found in the last column of the tables in FIG. 9-11, under the "Vector Angle" column. The "Vector Angle" stripiness for the bin map (A, B, C, B, A, B, C, B, A, B, C, B) is calculated as −8.48 radians. The "Vector Angle" stripiness for the bin map (D, B, C, B, A, B, C, B, A, B, C, B) is calculated as −7.05 radians. The "Vector Angle" stripiness for the bin map (A, D, C, B, A, B, C, B, A, B, C, B) is calculated as −6.95 radians. Therefore, the "Vector Angle" stripiness provides a similar relative ranking of the bin maps as the "L1 Norm" stripiness: (A, D, C, B, A, B, C, B, A, B, C, B) being more optimal than (D, B, C, B, A, B, C, B, A, B, C, B) which in turn is more optimal than (A, B, C, B, A, B, C, B, A, B, C, B). It should be appreciated from the "Vector Angle" stripiness and "L1 Norm" stripiness that other measures of stripiness may be possible.

It is noted that negative stripiness values is purely a stylistic choice. Since stripiness is a measure of deviation from an optimal state, it was decided that negative values should be used, since a negative value has a connotation of something that is undesired. However, in another implementation, stripiness values, of course, could be positive values, with no impact on the data migration process.

Figure 12:
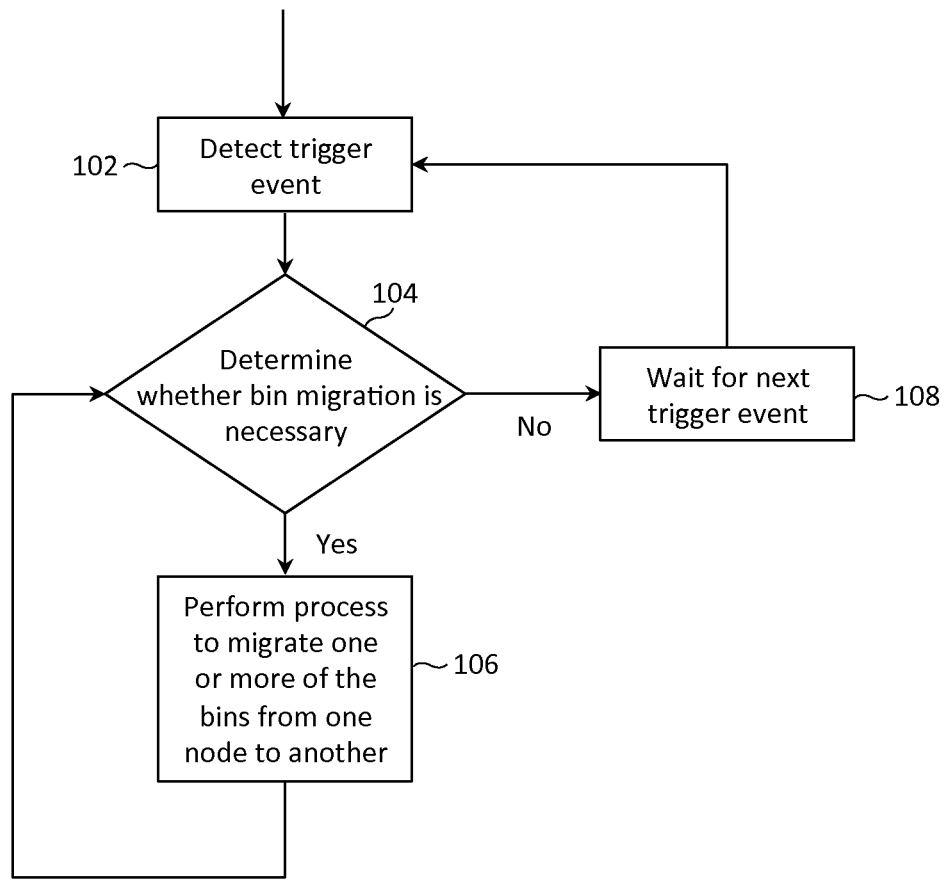
FIG. 12 depicts a flow chart of a data migration algorithm, in accordance with one embodiment of the invention.

FIG. 12 depicts a high level overview of a data migration process, in accordance with one embodiment of the invention. At step 102, a trigger event is detected. A trigger event may include the addition of a node to a storage system (similar to the addition of node D, as described above), the resizing of a node, the occupancy of a node reaching a certain threshold (e.g., 90%), the removal of a node, etc. Following a trigger event, the process may determine (at step 104) whether bin migration is necessary. Such determination may involve analyzing the occupancy percentage of each node. If the occupancy percentages are within, e.g., 5% of one another, it may be determined that no bin migration is necessary. In addition or in the alternative, such determination may involve analyzing the ratio of the number of bins assigned to each node, normalized by the node capacity. If these ratios are within, e.g., 5% of one another, it may be determined that no bin migration is necessary. In addition or in the alternative, such determination may involve comparing the stripiness of the bin map to a threshold. In addition or in the alternative, such determination may involve comparing the number of bin migrations performed since the last trigger event to a threshold.

If bin migration is necessary, the process proceeds to step 106, in which a process is performed to migrate one or more bins from one node to another. The bin migration process has been explained above and will be further detailed in FIG. 13. Following the migration of one or more bins, the process may re-evaluate (at step 104) whether further bin migration is necessary. If bin migration is not necessary, the process waits for the next trigger event (step 108). If a further trigger event is detected (at step 102), the process again proceeds to step 104.

Figure 13:
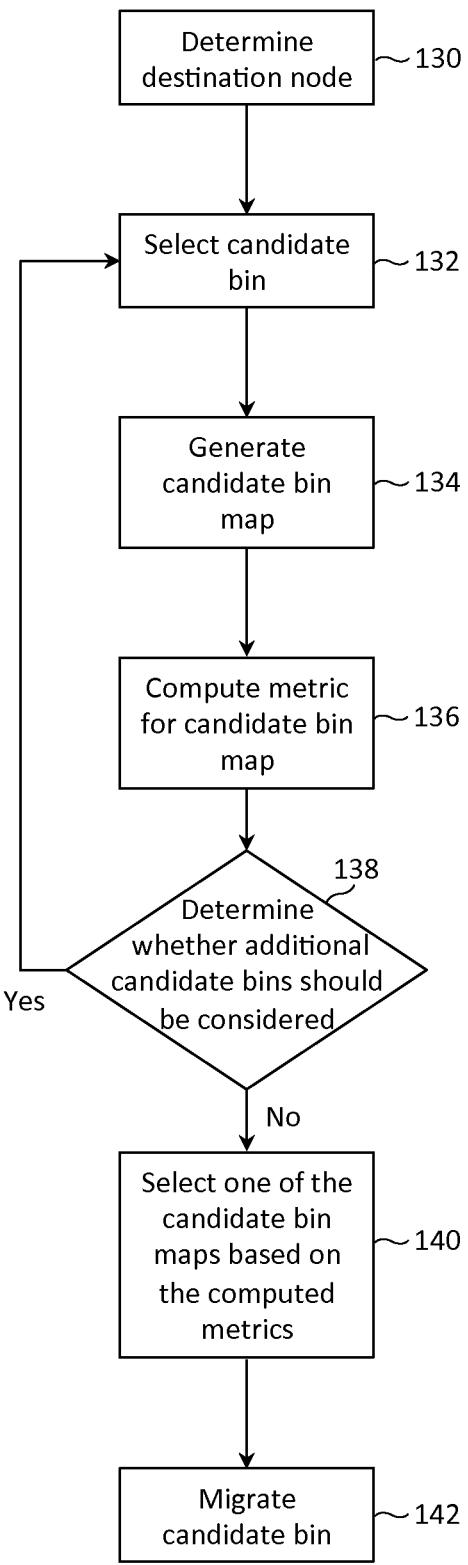
FIG. 13 depicts a flow chart of an algorithm to migrate one or more bins from one node to another, in accordance with one embodiment of the invention.

FIG. 13 depicts a process for migrating one or more bins, according to one embodiment of the present invention. At step 130, a destination node is determined. As explained above, the destination node may correspond to the node which is most underrepresented in the bin map or may correspond to the node which has the minimum ratio of the number of bins assigned to the node divided by the capacity of the node.

At step 132, a candidate bin is selected (i.e., a bin that is a candidate for migration to the destination node). As a basic requirement, the candidate bin should not already be assigned to the destination node; otherwise, no migration would be accomplished. The candidate bin may be any randomly chosen bin that has not already been selected as a candidate bin since the last bin migration. In another embodiment, the candidate bin may be the lowest numbered bin that has not already been selected as a candidate bin since the last bin migration. If the candidate bin is already assigned to the destination node, another candidate bin may be selected.

At step 134, a candidate bin map may be generated based on the existing bin map. More specifically, the candidate bin map may be identical to the existing bin map, except with the candidate bin reassigned to the destination node.

At step 136, a metric may be computed for the candidate bin map, quantifying the optimality of the bin map with respect to capacity balance and data striping performance. The metric may be the L1 Norm stripiness metric, the Vector Angle stripiness metric, another stripiness metric, or another metric. The computation of such metrics has been described above in association with FIGS. 9-11.

At step 138, the process may determine whether additional candidate bins should be considered. Such determination may be based on whether all possible candidate bins have already been considered. If so, the process may determine that no additional candidate bins should be considered. Such determination may alternatively be based on whether a certain predetermined number of candidate bins have been considered. For instance, it may be required that (at least) 10 candidate bins be considered. If the certain predetermined number of candidate bins have been considered, the process may determine that no additional candidate bins should be considered. In another embodiment, such determination may be based on whether any of the computed stripiness values satisfies a criterion. For instance, it may be regarded that a stripiness value for a candidate bin map which is, e.g., 10% smaller (e.g., absolute value of stripiness being smaller) than the stripiness value for the existing bin map is acceptable, and no further candidate bins need to be considered.

If it is determined that additional candidate bins should be considered, the process returns to step 132, where an additional candidate bin is selected. Otherwise, the process proceeds to step 140, where one of the candidate bin maps is selected, based on the computed metrics (e.g., stripiness values). The selected candidate bin map may be the candidate bin map with a metric (e.g., stripiness value) closest to 0. Upon one of the candidate bin maps being selected, the process may proceed to step 142, where the candidate bin is migrated to the destination node in accordance with the selected candidate bin map. Such migration may involve transferring the data of all slices assigned to the candidate bin from an existing node to the destination node. It is noted that a check (not depicted) of whether there is sufficient capacity in the destination node may occur before step 142. Otherwise, migrating the candidate bin in step 142 might cause the destination node to exceed its capacity.

While the description so far has considered modifying only one bin assignment at a time in a candidate bin map, it is possible that a plurality of bin assignments may be modified at once. The computation of stripiness may proceed in the same fashion as described above, regardless of whether one (or more) bin assignments are modified in a candidate bin map.

Further, it is noted that multiple bin migrations may occur in parallel, since the process of migrating data (i.e., data from all slices assigned to one bin) from one node to another node may take some time. More specifically, a first bin migration might be occurring in step 142. While that is happening, it may be determined that further bin migration is necessary in step 104, and a second bin migration might commence at another instance of step 142 while the first bin migration is still underway. It is noted that even though the first bin migration might still be underway, the bin map is already updated to account for the first bin migration, such that the subsequent iteration through the process in FIG. 13 is based on the updated version of the bin map, and not the earlier version of the bin map.

Figure 14:
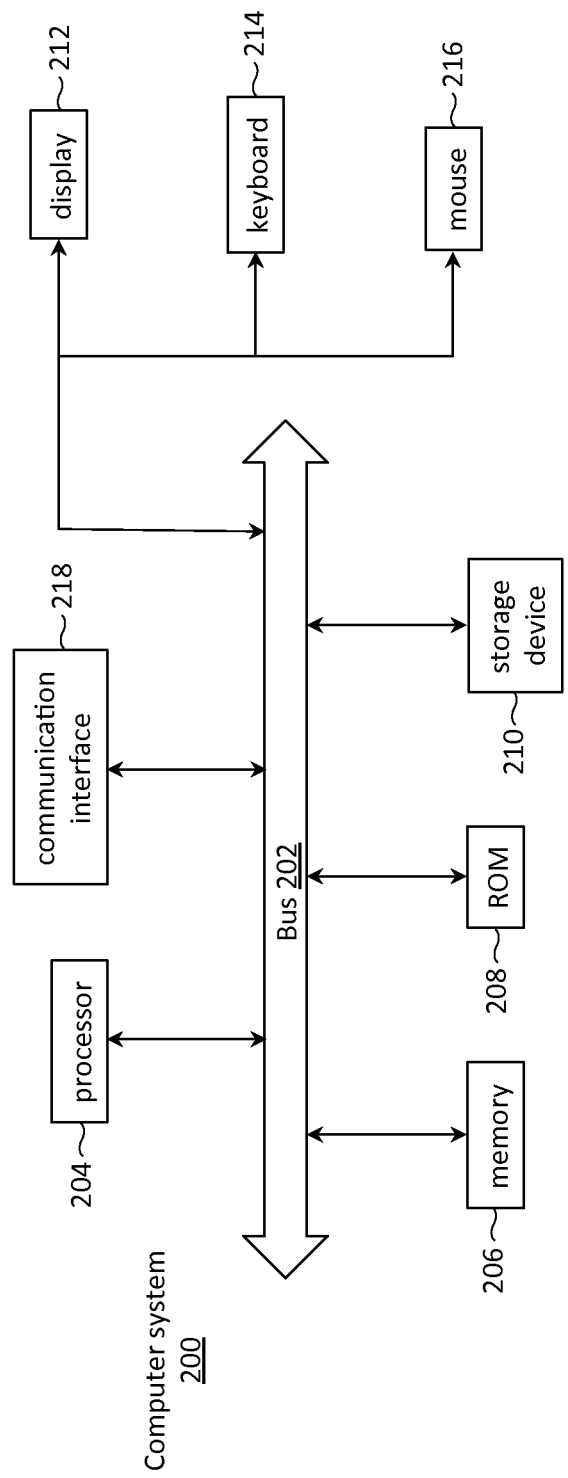
FIG. 14 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 14 provides an example of computer system 200 that is representative of any of the storage systems discussed herein. Further, computer system 200 is representative of a device that performs the processes depicted in FIGS. 12 and 13. Note, not all of the various computer systems may have all of the features of computer system 200. For example, certain of the computer systems discussed above may not include a display inasmuch as the display function may be provided by a client computer communicatively coupled to the computer system or a display function may be unnecessary. Such details are not critical to the present invention.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, is coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 provides a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods, systems and machine-readable media for migrating data between storage devices of a storage array have been described. It is to be understood that the above description is intended to be illustrative, and not restrictive. For example, in one embodiment stripiness as computed by two different ranges may be considered. Such a scheme is particularly useful in overcoming possible sub-optimal situations involving repeating patterns that are as big as the sub-range size. For example, if an ideal stripiness is A, B, B, C, D, D, then the bin map {B, B, D, D, C, A, B, B, D, D, C, A} looks perfect, despite being less stripey than {B, D, A, B, D, C, B, D, A, B, D, C}. By considering stripiness as computed by two different ranges (preferably with no common divisors, e.g., 6 and 7 for this current example), the second bin map is readily identified as being superior. Of course, many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a storage system having a plurality of nodes, each node being an independent device for storing data, the data organized into a plurality of bins, and each bin assigned to one of the nodes via a bin map, the method comprising:
   determining a destination node out of the plurality of nodes;
   for each of a plurality of candidate bins not already assigned to the destination node, (i) generating a candidate bin map based on the bin map, the candidate bin in the candidate bin map being assigned to the destination node, and (ii) computing a metric for the candidate bin map;
   selecting one of the candidate bin maps based on the computed metrics; and
   migrating one of the candidate bins to the destination node according to the selected candidate bin map,
   wherein each bin comprises a set of slices, each slice comprising a fixed sized portion of the data, and wherein the storage system includes X bins numbered $0, 1, 2 \ldots X-2, X-1$, and Y slices numbered $0, 1, 2 \ldots Y-2, Y-1$, and the $N^{th}$ bin contains every slice matching the formula (i*X+N) for i between 0 and $(Y-1-N)/X$.

2. The method of claim 1, wherein each node includes one of a magnetic disk drive and a solid-state device.

3. The method of claim 1, wherein the destination node is one of the nodes that is most underrepresented in the bin map.

4. The method of claim 1, wherein the destination node is one of the nodes with the minimum ratio of a number of bins assigned to the node divided by a capacity of the node.

5. The method of claim 1, wherein the plurality of candidate bins comprises all bins of the storage system that are not already assigned to the destination node.

6. The method of claim 1, wherein the plurality of candidate bins comprises a subset of bins of the storage system that are not already assigned to the destination node.

7. The method of claim 6, wherein the subset of bins is randomly chosen.

8. The method of claim 1, wherein computing a metric for each of the candidate bin maps comprises:
   forming vector b based on a capacity of each node, with the $j^{th}$ component of b being equal to a capacity of the $j^{th}$ node divided by the greatest common divisor of a set comprising the capacity of each of the nodes; and
   for each subrange in the candidate bin map comprising $\|b\|_1$ contiguous bins starting at bin i, forming vector $a_i$ with the $k^{th}$ component of $a_i$ being equal to a number of times the $k^{th}$ node is represented in the subrange starting at bin i,
   wherein the metric is calculated as $$-\sum_{i=0}^{X-1} \|a_i - b\|_1,$$

with X equal to the total number of bins.

9. The method of claim 1, wherein computing a metric for each of the candidate bin maps comprises:
   forming vector b based on a capacity of each node, with the $j^{th}$ component of b being equal to a capacity of the $j^{th}$ node divided by the greatest common divisor of a set comprising the capacity of each of the nodes; and
   for each subrange in the candidate bin map comprising $\|b\|_1$ contiguous bins starting at bin i, forming vector $a_i$ with the $k^{th}$ component of $a_1$ being equal to a number of times the $k^{th}$ node is represented in the subrange starting at bin i,
   wherein the metric is calculated as $$-\sum_{i=0}^{X-1} \|a_i - b\|^2,$$

with X equal to the total number of bins.

10. The method of claim 1, wherein computing a metric for each of the candidate bin maps comprises:
    forming vector b based on a capacity of each node, with the $j^{th}$ component of b being equal to the capacity of the $j^{th}$ node; and
    for each subrange in the candidate bin map of a predetermined number of contiguous bins starting at bin i, forming vector $a_1$ with the $k^{th}$ component of $a_i$ being equal to a number of times the $k^{th}$ node is represented in the subrange starting at bin i,
    wherein the metric is calculated as $$-\sum_{i=0}^{X-1} \cos^{-1}\left(\frac{a_i \cdot b}{\|a_i\| \, \|b\|}\right),$$

with X equal to the total number of bins.

11. The method of claim 1, wherein the selected candidate bin map is the candidate bin map with a metric closest to 0.

12. The method of claim 1, further comprising repeating the steps:
    for each of a plurality of candidate bins not already assigned to the destination node, (i) generating a candidate bin map based on the bin map, the candidate bin in the candidate bin map being assigned to the destination node, and (ii) computing a metric for the candidate bin map;
    selecting one of the candidate bin maps based on the computed metrics; and
    migrating one of the candidate bins to the destination node according to the selected candidate bin map,
    until all the nodes are occupied to a substantially similar percentage of each node's capacity.

13. A storage system, comprising:
    a plurality of nodes, each node being an independent device for storing data, the data organized into a plurality of bins, and each bin assigned to one of the nodes via a bin map;
    a processor;
    a storage device connected to the processor; and
    a set of instructions on the storage device that, when executed by the processor, cause the processor to:
    determine a destination node out of the plurality of nodes;
    for each of a plurality of candidate bins not already assigned to the destination node, (i) generate a candidate bin map based on the bin map, the candidate bin in the candidate bin map being assigned to the destination node, and (ii) compute a metric for the candidate bin map;

select one of the candidate bin maps based on the computed metrics; and migrate one of the candidate bins to the destination node according to the selected candidate bin map, wherein each bin comprises a set of slices, each slice comprising a fixed sized portion of the data, and wherein the storage system includes X bins numbered 0, 1, 2 . . . X−2, X−1, and Y slices numbered 0, 1, 2 . . . Y−2, Y−1, and the $N^{th}$ bin contains every slice matching the formula (i*X+N) for i between 0 and (Y−1−N)/X.

14. A non-transitory machine-readable storage medium for a storage system having a plurality of nodes, each node being an independent device for storing data, the data organized into a plurality of bins, and each bin assigned to one of the nodes via a bin map, the non-transitory machine-readable storage medium comprising software instructions that, when executed by a processor, cause the processor to:

determine a destination node out of the plurality of nodes;

for each of a plurality of candidate bins not already assigned to the destination node, (i) generate a candidate bin map based on the bin map, the candidate bin in the candidate bin map being assigned to the destination node, and (ii) compute a metric for the candidate bin map;

select one of the candidate bin maps based on the computed metrics; and migrate one of the candidate bins to the destination node according to the selected candidate bin map, wherein each bin comprises a set of slices, each slice comprising a fixed sized portion of the data, and wherein the storage system includes X bins numbered 0, 1, 2 . . . X−2, X−1, and Y slices numbered 0, 1, 2 . . . Y−2, Y−1, and the $N^{th}$ bin contains every slice matching the formula (i*X+N) for i between 0 and (Y−1−N)/X.

* * * * *